United States Patent [19]

Hansen

[11] Patent Number: 5,035,472
[45] Date of Patent: Jul. 30, 1991

[54] INTEGRATED MULTISPECTRAL MAN PORTABLE WEAPON SIGHT

[75] Inventor: Charles L. Hansen, Fort Belvoir, Va.

[73] Assignee: The United States of America as represented by the Secretary of the Army, Washington, D.C.

[21] Appl. No.: 540,733

[22] Filed: Jun. 20, 1990

[51] Int. Cl.$^5$ .......................... G02B 23/12; F41G 1/38
[52] U.S. Cl. ...................................... 350/1.1; 33/261; 250/333; 250/339
[58] Field of Search .................. 350/1.1, 1.2; 250/330, 250/339, 342, 333; 33/261

[56] References Cited

U.S. PATENT DOCUMENTS

| | | | |
|---|---|---|---|
| 4,040,744 | 8/1977 | Schertz et al. | 350/602 |
| 4,669,809 | 6/1987 | Patry et al. | 350/1.1 |
| 4,707,595 | 11/1987 | Meyers | 350/1.1 |
| 4,732,438 | 3/1988 | Orbach et al. | 350/1.1 |
| 4,822,994 | 4/1989 | Johnson et al. | 350/1.2 |
| 4,902,128 | 2/1990 | Siebecker et al. | 250/342 |
| 4,917,490 | 4/1990 | Schaffer, Jr. et al. | 250/342 |
| 4,961,278 | 10/1990 | Johnson et al. | 350/1.2 |

Primary Examiner—Bruce Y. Arnold
Assistant Examiner—Martin Lerner
Attorney, Agent, or Firm—Milton W. Lee; Anthony T. Lane

[57] ABSTRACT

A multispectral sight integrated onto a man portable rifle or stand alone weapon device for sighting the rifle or for surveillance by the device. The multispectral sight is contained in a unitary housing attached to or manufactured as an integral part of the man-pack weapon, such as from the forestock to the shoulder stock of a rifle, the sight is comprised of common objective optics and eyepiece optics. Between the objective optics and eyepiece optics and optical devices for collecting and separating input radiant energy into a plurality of distinct wavelength spectrum channels, electronic processing means for processing a visible spectrum and for processing and converting to the visible spectrum a near infrared spectrum and a far infrared spectrum in each of three spectrum channels, and optical devices for routing the outputs from the separate channels into the common eyepiece optics for viewing of a scene at all light levels.

12 Claims, 5 Drawing Sheets

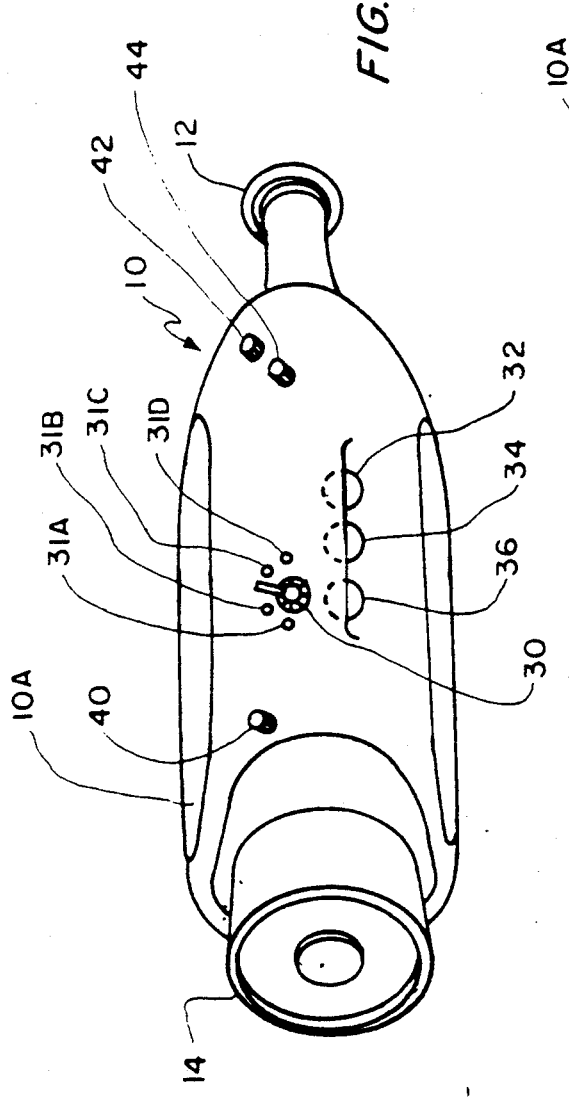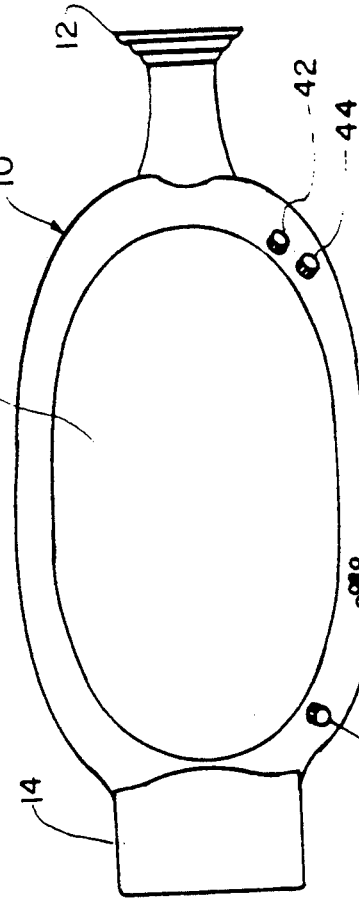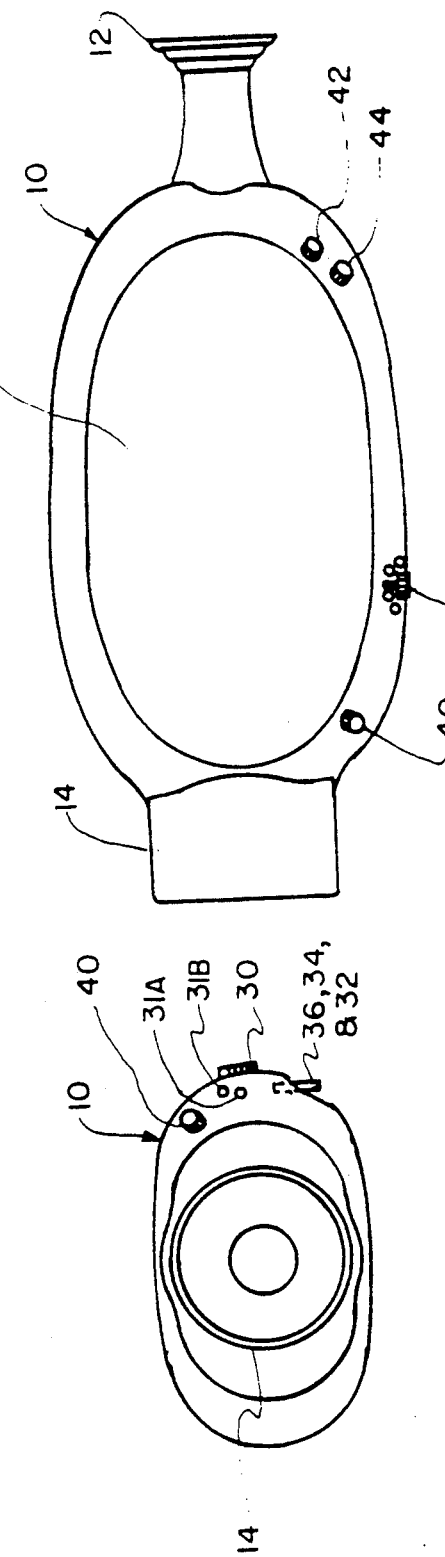

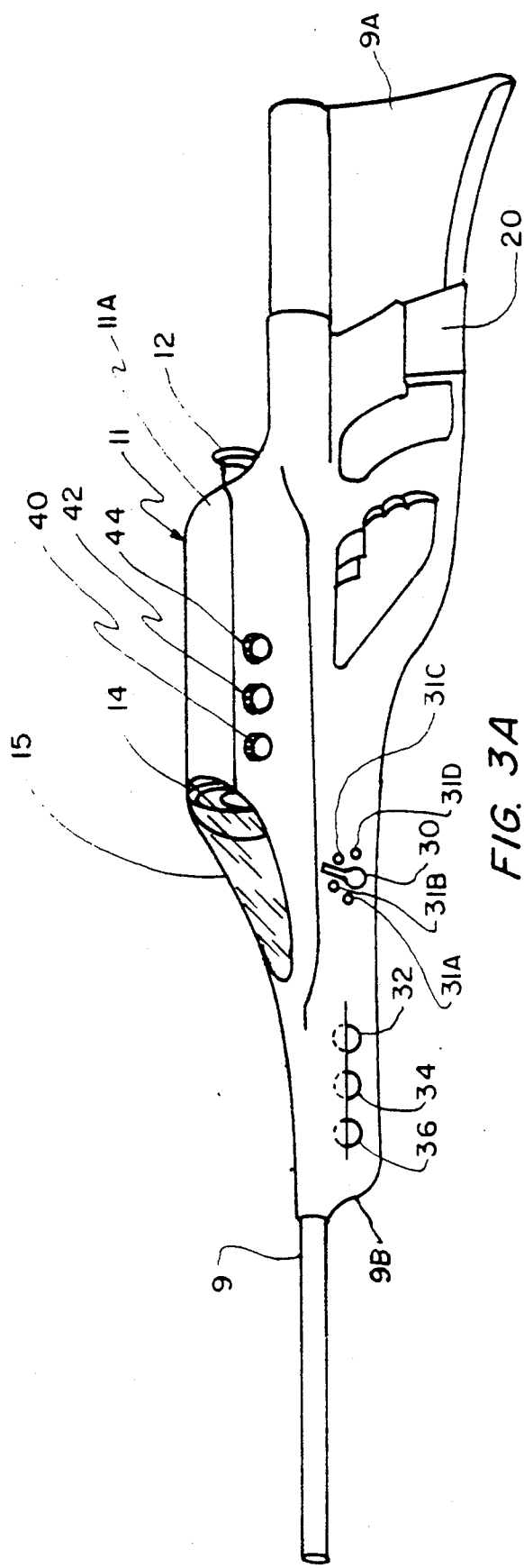
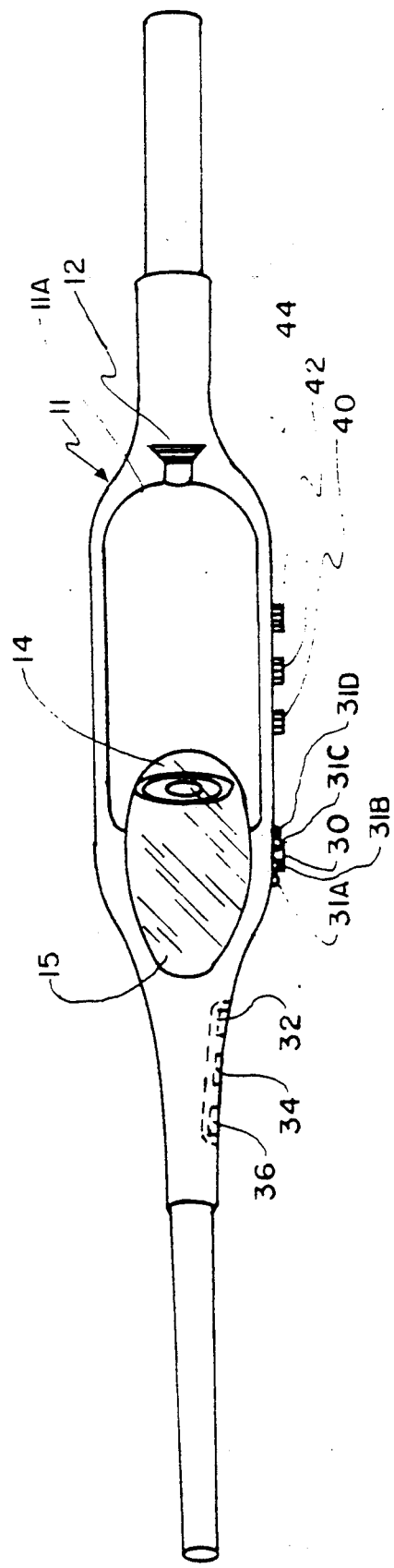
FIG. 3A
FIG. 3B

INTEGRATED MULTISPECTRAL MAN PORTABLE WEAPON SIGHT

The invention described herein may be manufactured, used, and licensed by the U.S. Government for governmental purposes without the payment of any royalties thereon.

BACKGROUND OF INVENTION

1. Field

The present invention relates to an integrated electro-optical weapons sight, and especially to a multispectral sight integrated with a weapon which may be used either in daytime, twilight, or nighttime environments without changing the sight.

2. Prior Art

Daytime optical small weapon sighting is presently conducted by a variety of telescopes. A case in point is the Leopold and Stevens Ultra X-3 rifle sight used on the U.S. Army's M-24 sniper rifle. The daytime performance of this sight is acceptable. However, this sight must be dismounted from the rifle in order to mount a sight with a different spectral response for other than daytime sighting, such as the near infrared and far infrared spectrums used respectively in the U.S. Army's image intensifiers ($I^2$) and the forward looking infrared (FLIR) viewers.

Boresight accuracy may not be maintained during field mounting and dismounting when various single spectrum sights or viewers are used in a mission requiring multispectral observation. The total size and weight if all three sights are mounted on a weapon at the same time can become excessive and adversely affect the success of a military mission.

SUMMARY OF THE INVENTION

The present invention is comprised of a multispectral sight which has a plurality of multispectral optical and electrical elements attachable in at least three distinct spectrum processing channels between common objective and eyepiece optics which are enclosed within a unitary housing that is permanently molded onto a U.S. Army rifle or some other man portable type weapon. The molded housing preferably replaces the normal forestock and shoulder stock and the trigger housing therebetween. The housing has an elongated opening on the top through which the multispectral optical and electrical elements and objective and eyepiece optics are attachable to an optical bench which is attached to the man portable weapon. The multispectral sight is boresighted with the weapon and the elements secured tightly so as not to jar loose later. The elongated opening may be hermetically sealed by a sighting window and an access cap. Prior to the window and cap being hermetically sealed, the internal portion of the housing is preferably pressurized with nitrogen gas to prevent moisture or outside matter from contaminating the optical and electrical elements.

The housing has a sequential rotary switch on the exterior thereof for selectively switching on a processing means for each of the three distinct spectrum channels. These spectrums are preferably a visible spectrum for daytime viewing, a near infrared spectrum for twilight viewing, and a far infrared spectrum for thermal viewing at nighttime. A plurality of thumb nail rotary switches on the exterior of the housing controls the reticle brightness and the scene contrast and brightness. There are other exterior controls for adjusting the focus and for windage and elevation.

The invention will be understood by reference to the following detailed description in view of the drawings.

BRIEF DESCRIPTION OF THE DRAWINGS

FIGS. 2A, 2B, and 2C are views of the detachable housing of FIG. 1 respectively by angled side view, front objective end view, and top view;

FIGS. 3A and 3B illustrate respectively a side elevational view of a rifle having a unitary housing for the multispectral sight permanently molded thereon and a top view of the unitary housing;

DETAILED DESCRIPTION OF THE PREFERRED EMBODIMENTS

Figure 1:
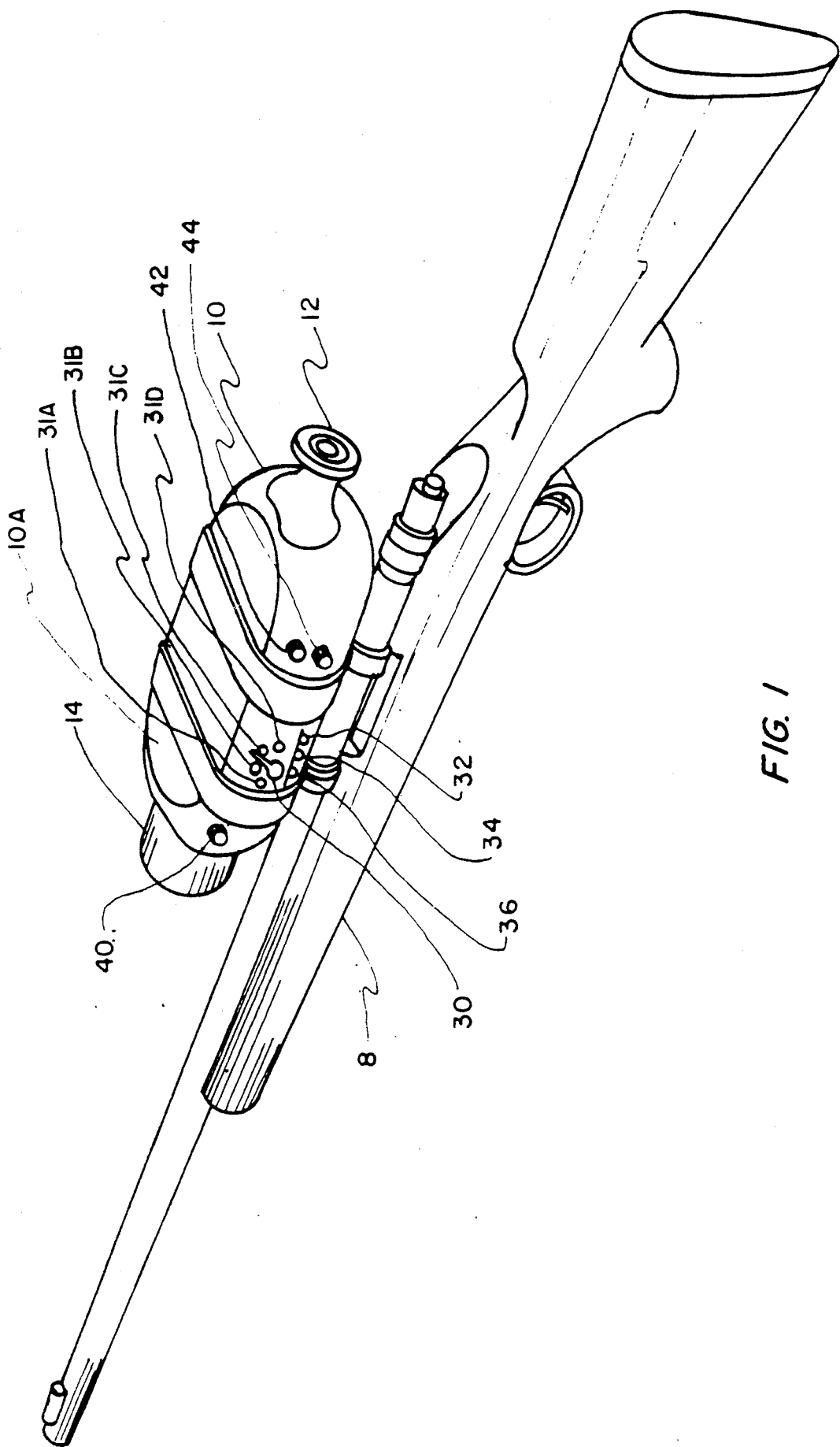
FIG. 1 illustrates a sniper rifle on which the multispectral sight is mounted within a detachable housing.

Refer to FIGS. 1, 2A, 2B, and 2C for perspective views of a unitary housing 10 mountable on a sniper rifle 8, which can house the same multispectral sight as can the molded housing 11 as an integral portion of a combat rifle 9, as shown by FIGS. 3A and 3B.

The multispectral sight unitary housing 10 may be mounted on the sniper rifle 8 in the usual manner, such as by coupling brackets or attaching at least two bands around both 10 and 8. Housing 10 has a top cover 10A through which the multispectral sight may be secured within 10 and then 10A is hermetically sealed to 10 after the sight has been boresighted with the rifle. Housing 10 has an objective optics end 14 and an eyepiece optics end 12. A rotary switch 30 may connect to electrical contact 31A for activating the visible spectrum of the multispectral sight, contact 31B for activating the near infrared spectrum, contact 31C for activating the far infrared spectrum, or contact 31D for activating both the near infrared spectrum and the far infrared spectrum simultaneously. A plurality of thumb nail rotary switches 36, 34, and 32, which are partly recessed in housing 10 to prevent inadvertent turning, respectively adjust scene brightness, contrast, and the brightness of the reticle. Other control knobs are knob 40 for adjusting the focus, knob 42 for azimuth control, and knob 44 for elevation control.

FIGS. 3A and 3B should now be referred to for an illustration of the molded housing 11 used to integrated the multispectral sight (not fully shown) on rifle 9. Preferably, an optical bench (not shown) is first attached to rifle 9 and then housing 11 is molded over the optical bench forming the shoulder stock 9A and the forestock 9B, including the trigger housing and upper sight portions therebetween, onto rifle 9. The sighting window 15 and sealable access cap 11A are not placed on the opening on top of 11 until the various optics and the multispectral optical and electrical elements of the sight are mounted therethrough on the optical bench. A battery power source 20 is used to power the electrical elements. Leads from source 20 are fed through housing 11 to be power the electrical elements. Leads from source 20 are fed through housing 11 to be connected to the electrical elements. Even though 20 is shown in the shoulder stock 9A it may be at any convenient location within housing 11. The sighting window is elongated and sloping to cover the full field of view of the sight.

Items 30, 31A, 31B, 31C, 31D, 32, 34, 36, 40, 42 and 44 are shown on the left side of housing 11 for convenient manipulation by a person firing rifle 9 from the right shoulder. These items may also be placed on the right side for a person firing rifle 9 from the left shoulder. Also, the position of these items on either side are not limited to the positions shown in FIGS. 3A and 3B.

Figure 4:
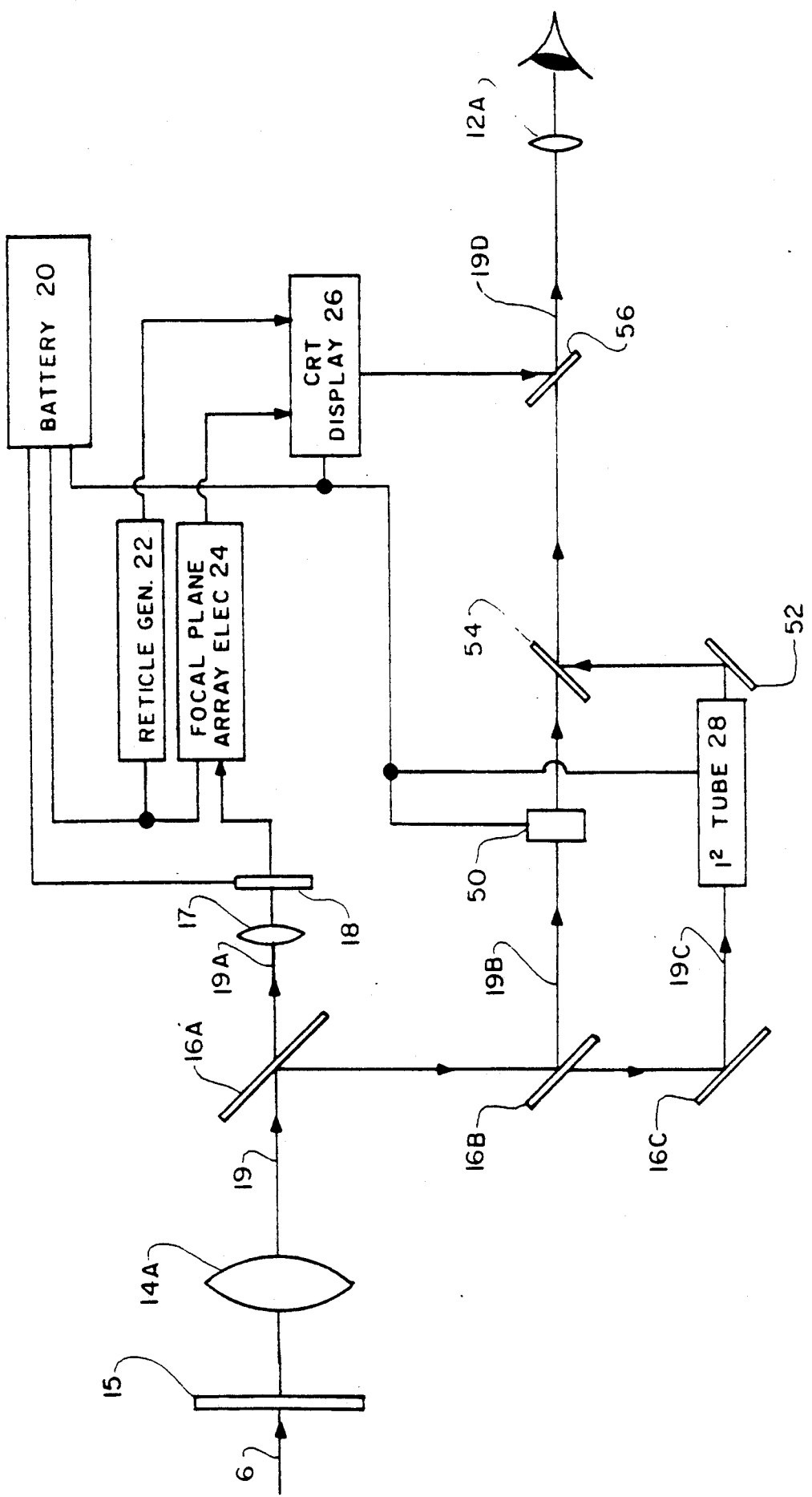
FIG. 4 is a schematic of the electrical and optical elements of one embodiment of the multispectral sight.
Figure 5:
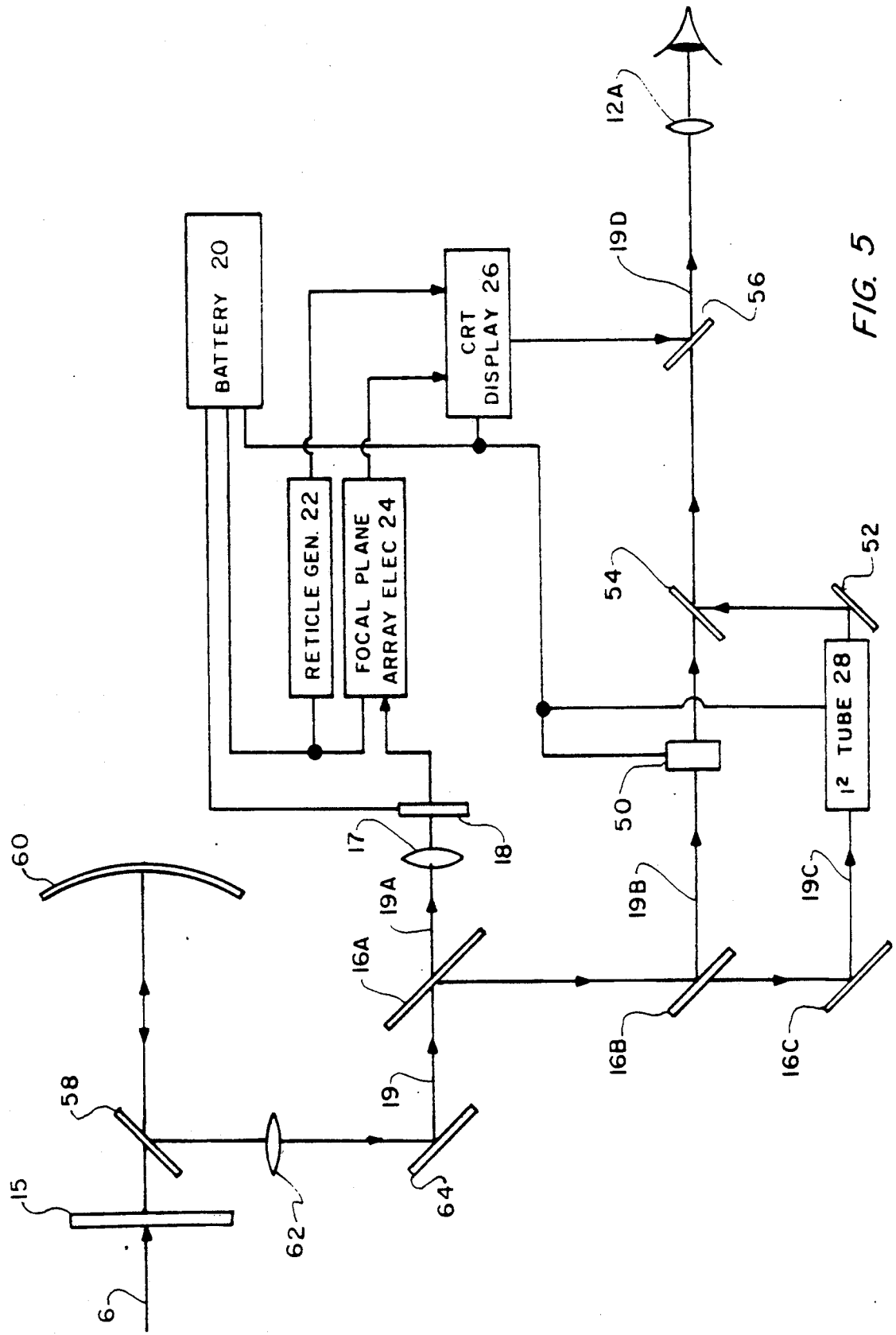
FIG. 5 is a schematic of the electrical and optical elements of a second embodiment of the multispectral sight.

FIGS. 4 and 5 are schematic block diagrams of the optical and electrical elements forming the multiple spectral channels between the objective optics and the eyepiece optics. It should be noted that FIGS. 4 and 5 only differ in the two embodiments of the objective optics. The multispectral radiant energy 6 from a typical scene enters the sight through sighting window 15 and through objective lens 14A along an objective optics common optical axis 19. A first partially reflective beam splitter 16A, preferably made of germanium, passes the 3um through 5um and the 8um through 14um wavelengths of radiant energy of interest along a far infrared spectrum channel 19A for processing. Beam splitter 16A reflects the shorter wavelength visible and near infrared spectrums to a second partially reflective beam splitter 16B which passes the near infrared spectrum of 0.7um through 1.1um radiant energy of interest which is reflected off a first fully reflective mirror 16C along a near infrared spectrum channel 19C for processing. Beam splitter 16B reflects the visible spectrum of 0.5um through 0.8um through 0.8um radiant energy of interest along a visible spectrum channel 19B for processing. The visible spectrum channel 19B, and the near infrared spectrum channel 19C are optically parallel with the far infrared spectrum channel 19A. All three channels have separate processing means and means for activating to process their respective radiant energy spectrums and whose processed signals exit therefrom along a common eyepiece optical axis 19D for an observer to view through eyepiece lens 12A.

A battery power source 20, which has appropriate voltage of say 26 volts d.c., is used for activating the electrical elements within all the spectrum channels. The far infrared spectrum channel operates as a nighttime sight and is comprised of the readily available U.S. Army forward looking infrared sight electro-optic elements as processing means. These elements are an imager lens 17 which collimates the infrared spectrum onto an uncooled focal plane array 18 controlled by focal plane array electronics 24 in which the far infrared spectrum is converted to equivalent electrical signals which are in turn fed directly to a cathode ray tube display 26 for reconverting the electrical signals to the visible spectrum at the output of 26. The visible spectrum from 26 is reflected off a fourth partially reflective beam splitter 56, which is red reflective, positioned along axis 19D for passage through eyepiece lens 12A to an observer. The far infrared spectrum processing means, i.e. elements 18, 24, and 26, may be switched on by rotary switch 30 rotated to contact 31C or combined with the near infrared processing means by being rotated to contact 31D.

The visible spectrum channel 19B operates as a daytime sight wherein the visible spectrum channel 19B optical axis is in direct alignment with the eyepiece optical axis 19D. A shutter means in the form of a light control valve 50 is used in the processing means of the visible spectrum. Valve 50 is on the visible spectrum channel 19B optical axis past the visible image plane for proper focus of the visible image at the input thereto. Value 50 may be a liquid crystal cell with power from power source 20 switchable thereto by rotary switch 30 connected to contact 31A to pass the visible spectrum therethrough or to block the passage of the visible spectrum therethrough if switch 30 is not connected to contact 31A. When the visible spectrum passes through 50 it passes directly through a third partially reflective beam splitter 54 and 56 and 12A for observation.

The near infrared spectrum channel 19C operates as a twilight sight which overlaps with the visible spectrum, i.e. down to the 0.7um wavelength. The processing means is preferably by a U.S. Army third generation image intensifier tube 28 which amplifies and magnifies the near infrared image at the input thereto. A second fully reflective mirror 52 at the output of 28 reflects the magnified near infrared radiant energy therefrom onto beam splitter 54, which is green reflective, positioned at the output of 50 along the common eyepiece optical axis 19D with 56 and 12A for viewing by an observer. Rotary switch 30 activates 28 when 30 is connected to either contacts 31B or 31D.

The thumb nail switches 32, 34, and 36 function as follows. Switch 32 adjusts reticle brightness by adjusting the power from 20 to the reticle generator 22 which in turn feeds directly to 26 for observation. Switches 34 and 36 control the power to 28, 18, 24, and 26 to respectively control the scene contrast and brightness. Knobs 40, 42, and 44 adjusts the focus, the azimuth or windage, and the elevation in the usual manner.

FIG. 5 illustrates another objective optic which may be used in some circumstances of indirect viewing, that is periscopic viewing, using the multispectral sight. In this embodiment the incoming radiation 6 after passing through the sighting window 15 is passed through a multispectral beam splitter 58 onto a parobolic reflector optic 60, which may be reflective or refractive, and is retroreflected from 60, off 58 and through objective lens 62 and off a third fully reflective mirror 64 and along a common objective optic common optical axis 19 toward the first partially reflective beam splitter 16A and proceeds as in the embodiment of FIG. 4.

The present multispectral sight provides a light weight, 24 hour per day, all weather electro-optic device for use by the military in a sighting system.

I claim:

1. A multispectral sight apparatus integrated onto a man portable type weapon for use in viewing a scene in all ambient light level conditions, said apparatus comprised of:

common objective optics for collecting incoming radiant energy from a variable light level scene and common eyepiece optics along a common eyepiece optical axis for viewing the scene;

a plurality of multispectral optical and electrical elements, said elements comprised of at least three distinct spectrum channels having optical parallel paths between said common objective optics and eyepiece optics wherein each of said at least three distinct spectrum channels process a distinct spectrum of radiant energy therein, a plurality of radiant energy routing optical devices for collecting and separating input radiant energy into each of said at least three distinct spectrum channels and recombining the outputs of said channels along said common eyepiece optical axis, and a processing means comprised of a battery power source and separate processing means in each of said at least three distinct spectrum channels for processing the radiant energy therein;

means for selectively activating each of the at least three processing means according to the ambient light level of said scene being viewed in which said multispectral sight apparatus selectively operates in the visible spectrum for daylight viewing, in the near infrared spectrum for twilight viewing, and in the far infrared spectrum for viewing in total darkness; and a unitary housing means for containing said common objective optics and eyepiece optics and said plurality of multispectral optical and electrical elements within a housing and having said means for activating said processing means on the exterior of said housing.

2. An apparatus as set forth in claim 1 wherein said at least three distinct spectrum channels are a visible spectrum channel, a near infrared spectrum channel, and a far infrared spectrum channel.

3. An apparatus as set forth in claim 2 wherein said visible spectrum channel processes radiant energy in the 0.5um to 0.8um range and said processing means is by a switchable light control valve is on the optical axis of said visible spectrum channel optically parallel path and is switchable to said power source by said means for selectively activating said processing means.

4. An apparatus as set forth in claim 3 wherein said light control valve is a liquid crystal cell.

5. An apparatus as set forth in claim 2 wherein said near infrared spectrum channel processes radiant energy in the 0.7um to 1.1um range and said processing means is a switchable image intensifier having the near infrared image plane at the input thereto on said near infrared spectrum channel optically parallel axis and is switchable to said power source by said means for selectively activating said processing means.

6. An apparatus as set forth in claim 2 wherein said far infrared spectrum channel processes radiant energy in the 3um to 5um range and/or the 8um to 12um range and said processing means is an imager lens which collimates the far infrared spectrum onto a focal plane array on said far infrared spectrum channel optically parallel axis, wherein said focal plane array electronics converts said far infrared spectrum into electrical signals which are inputted to a cathode ray tube display which converts said electrical signals into a visible spectrum replica of the original far infrared spectrum, and wherein said focal plane array and said cathode ray tube display are switchable to said power source by said means for selectively activating said processing means.

7. An apparatus as set forth in claim 2 wherein said plurality of radiant energy routing optical devices are comprised of a first partially reflective beam splitter which passes said far infrared spectrum along the optical axis of said far infrared spectrum channel through an imager lens which collimates said far infrared spectrum on said focal plane array and reflects said visible spectrum and said near infrared spectrum therefrom onto a second partially reflective beam splitter which passes said near infrared spectrum therethrough and reflects said visible spectrum into a light control valve in said visible spectrum channel whose optical axis is in direct alignment with said common eyepiece optical axis at the output of said light control valve; said visible spectrum channel optical axis is parallel with said far infrared spectrum channel optical axis, wherein said near infrared spectrum is reflected off a first fully reflective mirror into an image intensifier tube in said near infrared spectrum channel whose optical axis is also in parallel with said visible spectrum channel optical axis, said plurality of radiant energy routing optical devices further comprised of a second fully reflective mirror positioned at the output of said image intensifier which reflects the magnified near infrared spectrum of energy onto a third partially reflective beam splitter positioned on said common eyepiece optical axis at the output of said light control valve wherein said third partially reflective beam splitter passes said visible spectrum therethrough and is green reflective for reflecting said near infrared spectrum therefrom along said common eyepiece optical axis and a fourth partially reflective beam splitter positioned on said common eyepiece optical axis at the output of said cathode ray tube display which passes said visible spectrum and said near infrared spectrum therethrough along said common eyepiece optical axis and is red reflective to reflect said far infrared spectrum therefrom along said common eyepiece optical axis wherein all spectrums are selectively viewable through said common eyepiece optics.

8. An apparatus as set forth in claim 7 wherein said means for selectively activating each of said at least three processing means is comprised of a manually operable rotary switch on the exterior of said housing for sequentially switching said power source to said light control valve for processing only said visible spectrum, to said image intensifier for processing only said near infrared spectrum, and said focal plane array electronics and cathode ray tube display for processing only said far infrared spectrum, and to said image intensifier and said focal plane array electronics and cathode ray tube display combined for processing said near infrared spectrum and far infrared spectrum simultaneously, said means for selectively activating each of said at least three processing means further comprised of a plurality of manually operable thumb nail rotary switches for controlling reticle brightness and contrast and scene brightness.

9. An apparatus as set forth in claim 8 wherein said common objective optics is comprised of a sighting window transparent to said incoming radiant energy and an objective lens both in optical alignment with said first partially reflective beam splitter along said far infrared spectrum channel optical axis.

10. An apparatus as set forth in claim 8 wherein said common objective optics is comprises of a sighting window transparent to said incoming radiant energy and a multispectral beam splitter in optical alignment with a parabolic reflective optic in which said incoming radiant energy is passed through said multispectral beam splitter onto said parabolic reflective optic, is reflected back to and off of said multispectral beam splitter and through an objective lens, and is reflected off a third fully reflective mirror onto said first partially reflective beam splitter along said far infrared spectrum optical axis.

11. An apparatus as set forth in claims 9 or 10 wherein said sighting window is made of zinc sulfide.

12. An apparatus as set forth in claim 1 wherein said housing is manufactured about said man portable weapon from a forestock to a shoulder stock in which said weapon has an optical bench thereon for mounting said plurality of multispectral optical and electrical elements thereon through an elongated opening on the top of said housing, said plurality of multispectral optical elements are boresighted with said man portable weapon, said housing having a sealable access cap wherein said sighting window and said access cap are hermetically sealed over said elongated opening for permanently integrating said multispectral sight apparatus to said man portable weapon.

* * * * *